2 Sheets—Sheet 1.

J. M. AYER.

REFRIGERATING CAR.

No. 7,467.

Reissued Jan. 16, 1877.

Witnesses

Pennington Halsted

P. McNickle

Inventor

John M. Ayer by John J. Halsted his Atty.

J. M. AYER.

REFRIGERATING CAR.

No. 7,467. Reissued Jan. 16, 1877.

Witnesses.

Lemington Halsted

P. McNickle

Inventor

John M. Ayer by John J. Halsted.

his Atty.

UNITED STATES PATENT OFFICE.

JOHN M. AYER, OF CHICAGO, ILLINOIS.

IMPROVEMENT IN REFRIGERATING-CARS.

Specification forming part of Letters Patent No. 181,391, dated August 22, 1876; reissue No. 7,467, dated January 16, 1877; application filed October 16, 1876.

*To all whom it may concern:*

Be it known that I, JOHN M. AYER, of Chicago, in the county of Cook and State of Illinois, have invented new and useful Improvements in Refrigerator-Cars, which are fully described in the following specification, reference being had to the accompanying drawings, in which—

Figure 1:
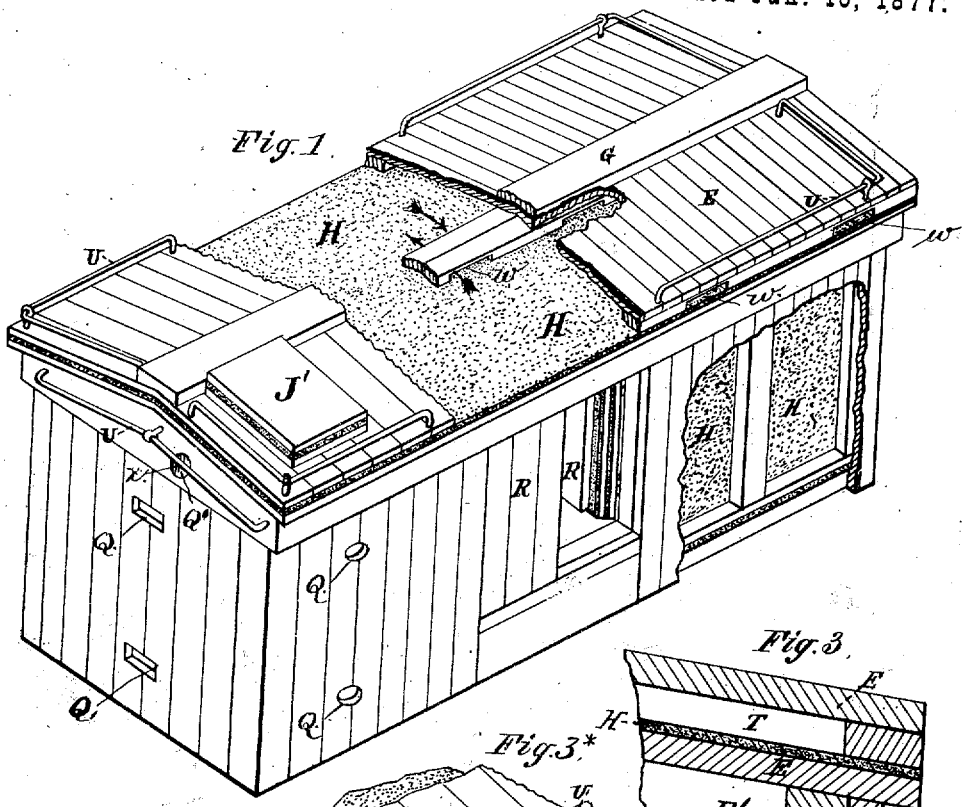
Figure 3:
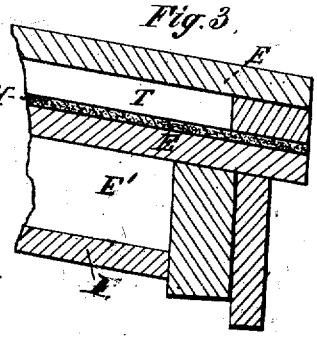
Figure 3:
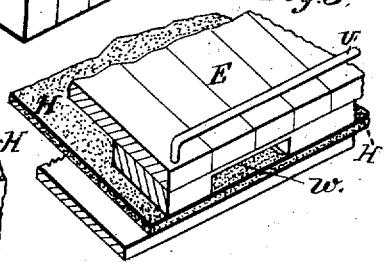
Figure 4:
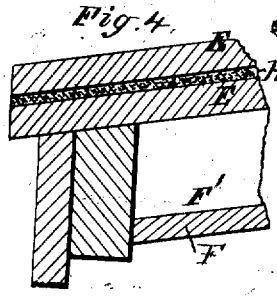
Figure 2:
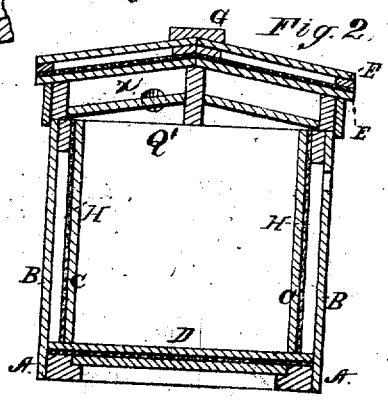
Figure 5:
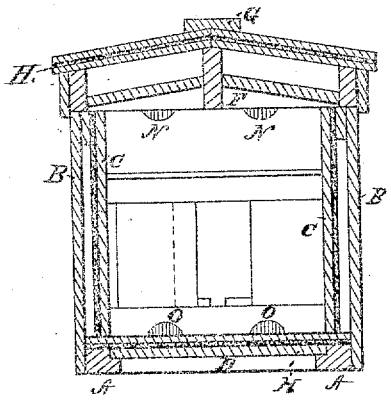
Figure 6:
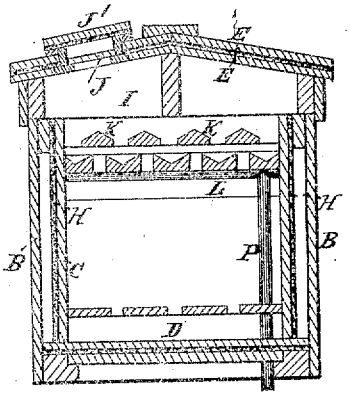
Figure 8:
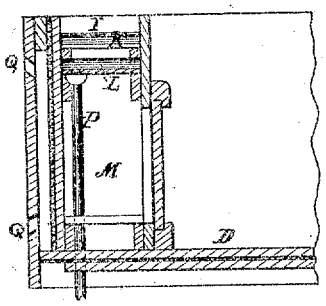
Figure 7:
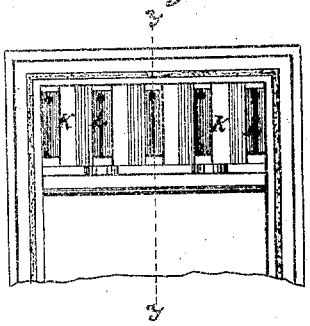
Figure 9:
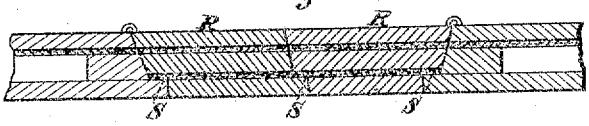

Figure 1 is a perspective view of the car with certain portions cut away; Fig. 2, a transverse sectional view through the car; Figs. 3 and 4, enlarged detail views, showing two constructions of the roof; Fig. 3*, a detail in perspective, enlarged; Fig. 5, a transverse sectional view, showing the interior of the car; Fig. 6, a transverse sectional view through the refrigerator portion of the car; Fig. 7, a plan view of the refrigerator with the roof of the car removed; Fig. 8, a vertical section taken at the line *y y*, Fig. 7; and Fig. 9, a horizontal section of the car-door, and a detached portion of the side of the car to which the doors are attached.

My invention relates to what are termed "refrigerator railway-cars," used for the purpose of preserving articles by keeping them cool while being transported to a remote market. To this end its leading features consist, first, in lining or incasing the car with india-rubber or rubber packing; second, in a rubber lined or incased car, having air-chambers surrounding the rubber, or the "rubber packing," as it is termed; third, in the combination, with two air-spaces in the roof, located one above the other, of an interposed rubber sheathing; fourth, in the combination, with a refrigerator-car, of a door provided with rubber applied to lap at its joints; fifth, in the combination, with two air-spaces in the roof, one above the other, and with their interposed rubber sheathing or rubber packing, of a double-walled car or refrigerator having an air space or spaces, and also a lining of india-rubber or packing lying within the said walls; sixth, in combination with the double walls and their inclosed unfilled air-space, openings for the supply of currents of air through such space, and in other details, hereinafter set forth.

A in the accompanying drawing represents the frame of a railway-car; B B, the outside boards, which are tongued and grooved, or otherwise closely fitted together. C C are the inside or lining boards of the car. D is a double floor. E E are the roof-boards, which are made double, and F is an inside lining of boards near the roof, affording an additional air-space, F′. G is an ordinary race-board on top of the car. H represents the layer of india-rubber cloth or rubber packing, which makes a lining to the walls, and also between the roof-boards and between the floor-boards, as shown in the drawings.

I do not, however, limit myself to placing the india-rubber lining in just the position here shown, it being my purpose to place it in such positions in the roof, floor, and walls as to form a lining or coating thereto, and make the car impervious to heat.

I have an ice-apartment, I, at each or either end of the car, which may be reached by a man-hole, J, through the roof of the car, the outer cover J′ of this man-hole being rubber-lined. K K are beveled strips, upon which the ice is placed, and L L are concave strips placed beneath the beveled strips K, and serving to catch the drip as the ice melts, and at the same time to permit the circulation of the air through the compartment, as hereafter specified. P, Figs. 6 and 8, is a pipe for conducting the water from the refrigerator. There may be placed in this pipe a valve, which will admit of the water passing out, and prevent the admission of air. M is a small compartment under the ice, in which such articles are placed as are desirable to keep particularly cool. N N (see Fig. 5) are air-passages from the main cooling-apartment of the refrigerator into the ice-apartment, and O O are air-passages from the compartment M into the main cooling-apartment. The air passes from the main cooling-apartment into the ice-apartment, where it comes in contact with the ice, passes down between the beveled strips K and convex strips L into the apartment M, and out into the main cooling-apartment. Q Q Q′ Q′ are openings through the outer case of the refrigerator-car, opening into the air space or spaces at such places as will produce ventilation of air through these spaces. I place these openings so as to ventilate any air-space. I may make them either in the wall, roof, or floor. The doors R of the car are made solid, of three thicknesses of boards, with the sheet rubber or lining of rubber packing between them, and so constructed as to make bevel-joints, and also with rabbets to make lap-joints with the car and with each other when two doors are used, and a rubber packing makes a tight fit in each of the rabbets or joints, as shown at S, Fig. 9. This rubber-sheathing or packing lining the door completes the continuous rubber incasement of the entire car, and the rubber-lined joints not only make the door close and air-tight when closed, but also prevent all rattling and shaking or leakage, as the compressed rubber, by reason of its elastic character, may yield without gaping, the door being cushioned against the rubber, and the bevels causing it to wedge closely. The roof I make either with an air-space, as shown at T in Fig. 3, or without it, as shown in Fig. 4; but in either case I employ the rubber sheathing H between them. To insure a proper circulation or currents of air through the air-space T, it is provided with appropriate inlet and outlet passages *w w*, and these make a connected air-space under the entire roof. The air-space F′ is a commodious one of considerable depth, and being placed beneath one layer of non-conducting rubber and two layers of wood, as in Fig. 4, or beneath the same and an additional air-space, T, through which air-currents are passing, (see Fig. 3,) it performs a most important duty in excluding heat from the car. This space F′ may be kept entirely closed, or a circulation of air through it may be secured by removing the plugs or covers *x* from the openings or air-passages Q′ Q′.

By my construction I make a refrigerating-car which is almost absolutely impervious to heat, dust, and other influences from the external atmosphere, in which there is a free circulation of air from the ice-apartment to and through the cooling apartment without admitting any currents from the external atmosphere, in which the space between the outer and inner walls is continually ventilated, such space being open and free, and having no filling to absorb and retain moisture or gas, as is invariably the case when such space is filled with any material which, soon becoming foul, must permanently "stench" the whole car and damage its contents, and in which there is no leakage of air at the door, or at the manhole or hatchway. I also avoid metal casings or linings, which add too much to the weight of a car, and are costly, and will rust or oxidize, besides being illy adapted for making close and tight joints, especially at doors, and which also have the further serious objection that they absorb and retain heat, while wood and rubber are free from all these objections, both being good non-conductors.

My car is a light one, weighing no more than an ordinary freight-car, and the consumption of ice in it is very materially less than in any refrigerating-car known to me; and at a very small expense any ordinary box freight-car can be converted into a refrigerating-car in accordance with my invention, and a new one can be constructed at very much less cost than any other refrigerator-car known to me.

I also avoid exposing the contents of the car to any direct odor or exhalation from rubber, or to any heat-conducting metallic surface, as I do not use the latter; and as my rubber shell or covering has throughout the entire car a wooden inmost covering or lining, I also get the advantage of three good non-conducting media between the outer air and the contents of the car—namely, two layers of wood and their interposed layer of rubber—in addition to the air space or chamber between the walls.

I claim—

1. The combination, with the air-spaces T and F′, of an interposed rubber sheathing, substantially as and for the purpose set forth.

2. The combination, with a refrigerating-car, of a door having an inclosed sheet or sheets of rubber, and rubber-faced rabbets, substantially as and for the purposes set forth.

3. The combination of the two air-spaces T and F′, and the interposed rubber sheathing H, with a double-walled car having an unfilled air space or spaces, and a rubber sheathing between the said walls.

4. A car cased or lined throughout with rubber, and having air-chambers surrounding the rubber and between the double walls, and openings in the walls, permitting currents of air between them, substantially as shown and described.

JOHN M. AYER.

Witnesses:
HENRY RIEKE,
E. T. PRINDLE.